May 10, 1938.  E. N. MOOR  2,116,581
FISHING ROD REEL
Filed May 5, 1936
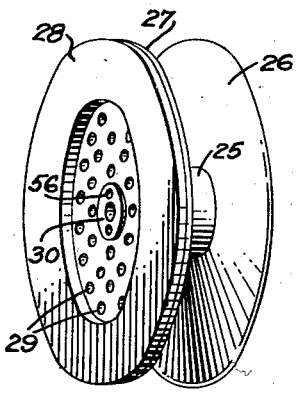
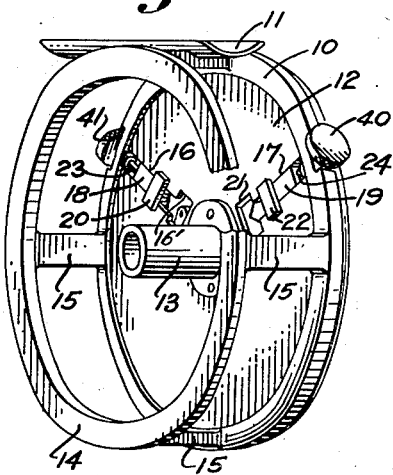
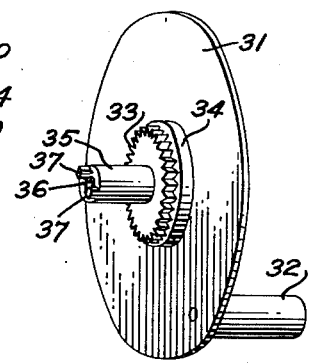
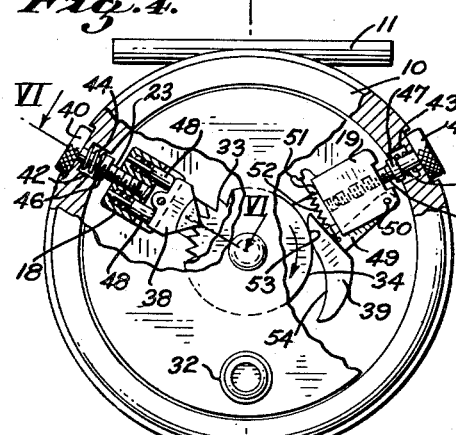
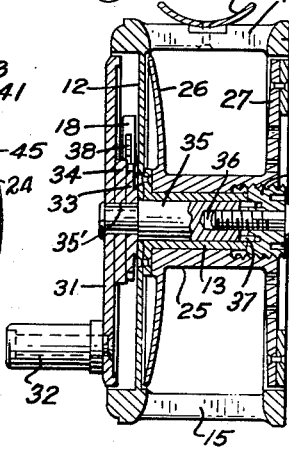
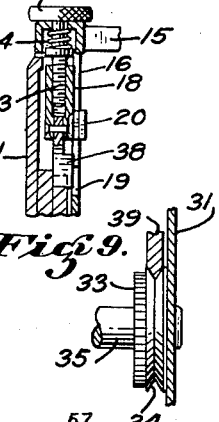
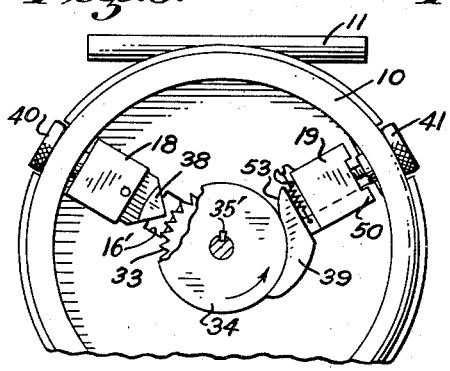
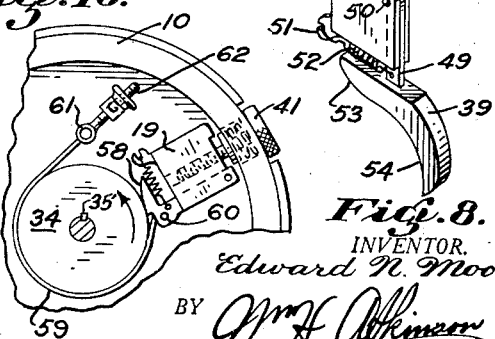
INVENTOR.
Edward N. Moor
BY
ATTORNEY.

Patented May 10, 1938

2,116,581

UNITED STATES PATENT OFFICE 2,116,581

FISHING ROD REEL

Edward Norton Moor, San Francisco, Calif., Elizabeth C. Moor, owner by Decree of Distribution Application May 5, 1936, Serial No. 77,928

15 Claims. (Cl. 242—84.6)

The present invention relates to fishing reels and more particularly to a number of improvements in the details of construction.

An object of the invention is to provide an improved reel for fishing rods having refinements in the click and brake features which provide advantages not possessed by reels of the prior art.

Another object of the invention is to provide a new and novel mounting for a click of a reel in which a fine adjustment of the click is possible.

Another object of the invention is to provide a new and novel form of self-energizing brake or drag for a fishing line reel which gives advantages not possessed by the prior art reels.

Another object of the invention is to provide an improved spindle and mounting for a line retaining reel which will permit a fine end play adjustment of the reel.

A further object of the invention is to provide an improved thumb braking arrangement for a reel of the narrow and enclosed type.

Other objects and advantages of the invention will be in part evident to those skilled in the art and in part hereinafter pointed out as the description proceeds.

For a full understanding of the invention reference should be had to the accompanying drawing, wherein there is shown by way of illustration and not of limitation, preferred embodiments thereof.

In the drawing, wherein like numerals refer to like parts throughout the several views;

Figure 1 is a perspective view of the reel body with a part broken away to disclose one of the details of construction, Figure 2 is a perspective view of a reel adapted to be used with the body member illustrated in Figure 1, Figure 3 is a perspective view of a handle carrying cover plate to which there is secured a brake drum and click wheel, Figure 4 is a side elevation of the reel with portions broken away to show the details of the click and brake mechanism, with the brake shown in its released position, Figure 5 is a view similar to Figure 4, with the cover plate removed and with the brake in its braking position and the click withdrawn to an inoperative position, Figure 6 is a fragmentary sectional view taken along line VI—VI of Figure 4 looking in direction of arrows, Figure 7 is a vertical sectional view of the reel taken along line VII—VII of Figure 4 looking in the direction of arrows, Figure 8 is a perspective view of the braking shoe and its supporting member, Figure 9 is a fragmentary view partially in section showing a modified form of braking drum, and Figure 10 is a fragmentary view showing a modified form of brake embodying the features of this invention.

As shown in Figure 1 of the drawing, my improved reel comprises a body member 10 which has a pole engaging plate 11 extending tangentially alone one side thereof. At one end of the body member 10 there is a dividing or supporting plate 12 upon which there is mounted a hollow spindle 13. Adjacent the outer end of the spindle 13 the body member 10 has a ring 14 which forms a guard around the free end of the line reel. This ring 14 is supported upon spaced struts 15. As shown in this figure of the drawing, the supporting plate 12 has two radially disposed slots 16 and 17 in which radially movable supporting members 18 and 19 are respectively disposed. The slot 16 has a transversely enlarged end 16' through which an overhanging portion 20 upon the supporting member 18 is adapted to be passed, as when the parts are being assembled, and likewise the slot 17 has a transversely enlarged end 21 through which an overhanging portion 22 upon the supporting member 19 may be passed in assembling same in the slot 17. The supporting members 18 and 19 are in this manner slidably secured within the slots 16 and 17. In order to provide for a radial adjustment of the supporting members 18 and 19 in the slots 16 and 17 they are respectively provided with adjusting or lead screws 23 and 24, as will hereinafter appear.

As shown in Figure 2 of the drawing, the line retaining reel is of the short spool type having a hub 25 from which there extends an inner flange 26 and an outer flange 27. The inner flange 26 is dished or cupped outwardly so as to clear the click and brake supporting members previously described, and the flange 27 is shown as having an externally applied thumb brake surface member 28 which is disposed in a position at the end of the reel where it may be conveniently engaged by the thumb. The outer flange 27 of the reel is also shown as perforated as at 29 to provide for ventilation and a drying of the line when upon the reel. The hub 25 of the reel is bored internally to fit snugly upon the hollow spindle 13 and at its outer end it has an adjustable plug 30 which is adapted to engage the end of the hollow shaft 13 and provide for a fine end plate adjustment of the reel, as will hereinafter appear.

As shown in Figure 3, the reel is provided with an end plate 31 having an operating handle 32 attached thereto. In the present embodiment the end plate 32 is shown as having a click wheel 33 and a brake drum 34 attached thereto. Mounted in keyed relation with the end plate 31, the click wheel 33 and the brake drum 34, there is a shaft 35 which is adapted to project into the hollow spindle 13. The end of the shaft 35 has an internal thread 36 and outside of the thread 36 there are two projecting splines 37. When the reel spool is assembled upon the spindle 13 and the end plate 31 is assembled upon the reel body 10 with the shaft 35 secured in splined relation with the plug 30 upon the reel, it is to be understood that the reel spool will be rotatable by means of the handle 32.

As shown in Figure 4 of the drawing, the click supporting member 18 has a body portion which overlaps the slot 16 and moves along the inside of the supporting plate 12 and carries a pivotally mounted click 38 which will engage the click wheel 33 when the reel is assembled. It will also be noted that the supporting member 19 likewise has a body portion which overlaps the slot 17 in which it is mounted and carries a pivotally mounted brake shoe 39 which is adapted to engage the brake drum 34. The lead screws 23 and 24 are also clearly shown in this figure of the drawing, as freely rotatable in the reel body 10 so that they may be freely turned therein by means of knurled heads 40 and 41 secured respectively upon the outer ends thereof. At the points where the lead screws 23 and 24 extend through the reel body 10 there are recesses 42 and 43 which accommodate compression springs 44 and 45. The springs 44 and 45 abut the body member 10 at their outer ends and at their inner ends they engage collars 46 and 47 which are secured respectively upon the lead screws 23 and 24. With this arrangement it will be understood that the supporting members 18 and 19 will be yieldingly held respectively by the springs 44 and 45 against outward movement in the position where they are finally adjusted by a turning of the lead screws 23 and 24. The click 38 is shown as having a pair of spring pressed plungers 48 which serve to center it with respect to its supporting member 18, and the brake shoe 39 is pivotally mounted by means of an arm 49 at a point 50 remotely removed from the brake drum 34 and at one side of the lead screw 24. Attached to the arm 49 and to a hook 51 upon the supporting member 19, there is a tension spring 52 which tends to urge the brake shoe 39 into engagement with the brake drum 34. At this point it will be noted that the brake shoe 39 has a reversely curved brake drum engaging surface which is so disposed that the brake drum 34 will cooperate with the spring 52 and draw the brake shoe 39 into braking engagement therewith when the brake drum 34 rotates in a line paying out direction. At this point it should be stated that the curved surface of the brake shoe 39 has a curved portion 53 which is slightly eccentric to its pivotal point 50 and is then curved so as to present a portion 54 which is substantially concentric to the brake drum when the brake is applied. The brake shoe 39 is here illustrated as in the position it will assume when the brake drum 34 is rotating in the direction shown by the indicating arrow upon the brake drum 34.

When the direction of the brake drum 34 is reversed, the brake shoe 39 will assume the position illustrated in Figure 5 of the drawing. Under these conditions the brake shoe 39, due to the eccentric nature of its curved portion 53, will exert an outward pressure upon its pivotal point 50 and move the supporting member 19 and the lead screw 24 outwardly so as to compress the spring 45 and produce a definite braking action or drag upon the brake drum 34, the amount of this braking action or drag being determined by the initial setting of the supporting member 19 along its lead screw 24.

In Figure 5 of the drawing, it will be noted that the click supporting member 18 has been withdrawn to hold the click 38 out of engagement with the click wheel 33. Under these conditions the reel spool can be rotated in either direction without the use of the click. In this figure of the drawing the brake shoe supporting member 19 is shown as adjusted to a brake applying position.

Upon referring to Figure 6 of the drawing, it will be noted that the click 38 is pivotally mounted in a transversely extending slot cut in the inner end of its supporting member 18. This figure of the drawing also shows the overhanging portion 20 upon the supporting member 18 as formed integral with the body member 18 and as having a radial length slightly less than the radial length of the enlarged end 16' at the inner end of the slot 16 which, as previously stated, is formed in the body member 10. The disposition of the lead screw 23 and its spring 44 upon the reel body is also clearly shown. In connection with this figure of the drawing, it will be noted that the enlarged opening 19 at the inner end of the radial slot 16 is positioned inwardly beyond the position normally taken by the click, and as a result the supporting member 18 can only be removed from the reel body 10 when the click wheel and brake drum have been completely removed.

As shown in Figure 7 of the drawing, the shaft 35 is slightly shorter than the hollow spindle 13 and the spline projections 37 are adapted to extend slightly beyond the end of the spindle 13. When the screw threaded plug 30 at the end of the reel spool abuts the outer end of the hollow spindle 13, the spline projections 37 will extend into keying relation therewith. The shaft 35 is preferably keyed at its other end to the end plate 31 and to the brake drum and click wheel by a key 35'. Extending through the adjusting plug 30 and the threaded outer end of the shaft 35 there is a screw 55. The plug 30 is shown as having pin receiving apertures 56, by means of which it may be turned into position by a suitable spanner wrench. With this form of mounting it will be noted that the line reel may be axially adjusted upon the hollow spindle 13 to provide for a minimum of end play and at the same time permit a free running of the reel spool. In practice, the adjusting plug 30 will have a tight fit within the reel spool, but as a precaution against displacement after adjustment, I may provide a pin type of key or a screw with an overhanging head in the end of the spool.

Upon referring to Figure 8 of the drawing, it will be noted that the brake shoe supporting member has a centrally extending ridge 57 which engages the slot 17. It is at the lower end of this ridge 57 that the transversely disposed overhanging portion 22, as shown in Figure 1, is disposed. As here shown, the arm 49 which pivotally supports the brake shoe 39 is disposed in a slot cut along one edge of the supporting member 19. The brake shoe 39 may be of metal, but it is preferably formed of fiber or some other material having a high coefficient of friction. The friction surface of the brake shoe 39 is shown as having a smooth brake drum engaging surface. However, it is conceivable that the brake drum engaging surface of the brake shoe 39 may have a surface of any configuration comparable to a like surface formed upon the brake drum. For example, in Figure 9 of the drawing, there is shown a modified form of the brake shoe 39 in which the brake drum 34 is grooved. This form of construction provides a greater braking surface upon the brake drum without any increase in the axial length of the brake drum 34.

In Figure 10 of the drawing, there is shown a modification of the present invention, wherein the brake shoe supporting member 19 has a pivotally mounted friction shoe 58 which is adapted to cooperate with the brake drum 34 in the manner above described and carry the free end of a brake band 59 into braking engagement with the brake drum 34. The free end of the brake band 59 is attached to the friction shoe 58 at the point 60 and at the fixed end of the brake band 59 there is an adjusting screw 61 by means of which the effectiveness of the brake band 59 may be determined.

While I have, for the sake of clearness and in order to disclose my invention so that the same can be readily understood, described and illustrated specific devices and arrangements, I desire to have it understood that this invention is not limited to the specific means disclosed, but may be embodied in other ways that will suggest themselves to persons skilled in the art. It is believed that this invention is new and it is desired to claim it so that all such changes as come within the scope of the appended claims are to be considered as part of this invention.

Having thus described my invention, what I claim and desire to secure by Letters Patent is—

1. In a fishing reel, the combination of a body member having an end plate, a reel supporting spindle projecting inwardly from said end plate, a reel upon said spindle, a brake drum rotatable with said reel, a brake shoe supporting member adjustably mounted upon said end plate, a brake shoe pivotally mounted upon said supporting member adjacent and in frictional contact with said brake drum, said brake shoe having its brake drum contacting surface eccentric to its pivotal axis, whereby it will be drawn into braking engagement with said brake drum when said reel is rotated to pay out line and to move out of braking engagement with said drum when said reel is rotated to retrieve the line, and means for adjustably positioning said brake shoe supporting member to limit the braking force produced by said brake shoe.

2. In a fishing reel, the combination of a body member having an end plate, a reel supporting spindle projecting inwardly from said end plate, a reel rotatable about said spindle, a brake drum rotatable with said reel and located on the outside of said end plate, a brake shoe supporting member adjustably mounted upon said end plate, a brake shoe pivotally mounted upon said supporting member and in frictional contact with said brake drum adapted to pivot into braking engagement with said brake drum when said reel is rotated to pay out line and to move when said reel is rotated to retrieve line, spring means for biasing said brake shoe supporting member toward said brake drum, and means for adjusting said brake shoe supporting member with respect to said spring means to determine the braking force produced by said brake shoe as it pivots into braking engagement with the brake drum.

3. In an improved fishing reel, the combination of a body member having a reel rotatably mounted thereupon, a brake drum rotatable with said reel, said body member having a slot therein, a movable brake shoe supporting member mounted in said slot, a brake shoe pivotally mounted upon said supporting member and in engaging relation with said brake drum, spring means cooperating with said brake drum adapted to move said brake shoe into braking engagement with said brake drum when the reel is rotated in one direction and yield to permit said brake shoe to move out of braking engagement with said brake drum when said reel is rotated in a reverse direction, and means for yieldingly holding said brake shoe supporting member and said brake shoe in cooperating relation with said brake drum.

4. In an improved fishing reel, the combination of a body member having a supporting plate at one thereof, a reel rotatably mounted upon said supporting plate, a brake drum rotatable with said reel, said supporting plate having a radially disposed slot therein, a radially movable brake shoe supporting member mounted in said slot, a brake shoe pivotally mounted upon said supporting member adapted to pivot into braking engagement with said brake drum when the reel is rotated in one direction and move out of braking engagement with said brake drum when said reel is rotated in a reversed direction, spring means for yieldingly holding said brake shoe supporting member and said brake shoe in cooperating relation with said brake drum, and means for adjusting said spring means to vary the braking effect of said brake shoe upon said brake drum.

5. In an improved fishing reel, the combination of a body member having a supporting plate at one end thereof, a reel rotatably mounted upon said supporting plate, a brake drum rotatable with said reel, said supporting plate having a radially disposed slot therein, a brake shoe supporting member slidably mounted in said slot, a brake shoe pivotally mounted upon said supporting member with a limited movement, said brake shoe having an eccentrically curved brake drum engaging surface which will increase its braking effect as it pivots in one direction, and means for yieldingly holding the surface of said brake shoe in cooperating relation with said brake drum, whereby said brake shoe will roll into increasing braking engagement with said brake drum when the reel is rotated in one direction and roll out of braking engagement with said brake drum when said reel is rotated in a reversed direction.

6. In an improved brake for a fishing reel, the combination of a body member having a spindle supported at one end thereof, a reel rotatably mounted upon said spindle, a brake drum rotatable with said reel, said body member having a slot disposed radial to said spindle, a brake shoe supporting member slidably mounted in said slot, a brake shoe mounted at the inner end of said supporting member and adapted to move substantially transversely thereof, said brake shoe having wedge-like configuration, and spring means for urging said brake shoe into wedging relation between said supporting member and said brake drum, whereby said brake shoe will be drawn into braking engagement with said brake drum when the reel is rotated in one direction and moved out of braking engagement with said brake drum when said reel is rotated in a reversed direction.

7. In an improved brake for a fishing reel, the combination of a body member having a spindle supported at one end thereof, a reel rotatably mounted upon said spindle, a brake drum rotatable with said reel, said body member having a slot disposed radial to said spindle, a brake shoe supporting member slidably mounted in said slot, a brake shoe mounted at the inner end of said supporting member and adapted to move substantially transversely thereof, said brake shoe having a wedge-like configuration, spring means for urging said brake shoe into wedging relation between said supporting member and said brake drum, whereby it will be drawn into increasing braking engagement with said brake drum when the reel is rotated in one direction and moved out of braking engagement with said brake drum when said reel is rotated in a reversed direction, and means for yieldingly adjusting the position of said supporting member in said slot to control the braking effect produced by said brake shoe.

8. In an improved brake for a fishing reel, the combination of a body member having a dividing plate at one end thereof, a reel rotatably mounted upon one side of said dividing plate, a brake drum rotatable with said reel and mounted upon the other side of said plate, said end plate having a radially disposed slot cut therein, a brake shoe supporting member slidably mounted in said slot, a brake shoe pivotally mounted upon said supporting member, said brake shoe having a reversibly curved brake drum engaging surface, spring means for yieldingly holding the reversely curved surface of said brake shoe in engagement with said brake drum, whereby said brake shoe will move with increasing braking effect upon said brake drum when the reel is rotated in one direction and move out of braking engagement with said brake drum when said reel is rotated in a reversed direction, and means for yieldingly positioning said brake shoe supporting member with respect to said brake drum to control the braking effect produced by said brake shoe.

9. In an improved self-energizing brake for a fishing reel, the combination of a body member, a reel rotatably mounted upon said body member, a brake drum attached to and rotatable with said reel, a brake shoe supporting member mounted for relative radial movement with respect to the periphery of said brake drum, spring means for biasing said supporting member toward the periphery of said brake drum, and a brake shoe movably mounted upon said supporting member and frictionally engaging the periphery of said brake drum, said brake shoe having a wedge-like configuration which will cause it to be drawn by friction into wedging relation between the periphery of the brake drum and its supporting member and compress said spring means to produce a braking action when the brake drum rotates in one direction and to move with the periphery of said drum out of wedging relation between the periphery of said drum and said supporting member to release the brake when said brake drum rotates in a reverse direction.

10. In a self-energizing brake for a fishing reel, the combination of a fishline retaining reel having a brake shoe accommodating cylinder rotatable therewith, a brake shoe adapted to cooperate with said cylinder, said brake shoe being pivoted at a point outwardly disposed from said cylinder and having its braking surface disposed eccentric to its pivotal point, whereby said brake shoe will be drawn into engagement with said cylinder with an increasing pressure when said cylinder rotates in one direction and move out of braking engagement with said cylinder when said cylinder rotates in an opposite direction, and means for yieldingly supporting the pivotal point of said brake shoe, whereby it may move outwardly as said brake shoe pivots into braking engagement with said cylindrical surface.

11. In a self-energizing brake for a fishing reel, the combination of a fishline retaining reel having a brake shoe accommodating cylinder rotatable therewith, a brake shoe adapted to cooperate with said cylinder, said brake shoe being pivoted at a point outwardly disposed from said cylinder and having its braking surface disposed eccentric to its pivotal point, whereby said brake shoe will be drawn into engagement with said cylinder with an increasing pressure when said cylinder rotates in one direction and move out of braking engagement with said cylinder when said cylinder rotates in an opposite direction, spring means for yieldingly supporting the pivotal point of said brake shoe, whereby it may move outwardly as said brake shoe pivots into braking engagement with said cylindrical surface, and means for adjusting the position of the pivotal point of said brake shoe with respect to said spring means to control the braking action.

12. In a self-energizing brake for a fishing reel, the combination of a line retaining reel having a brake drum rotatable therewith, a flexible brake band fixed at one end and disposed partially around the periphery of said brake drum, a friction shoe attached to the trailing end of said brake band, and means for movably securing said friction shoe in frictional engagement with the periphery of said brake drum at a point removed from the fixed end of said brake band, whereby said friction shoe will be moved with the brake drum to tighten said brake band upon the brake drum when said drum rotates in one direction and release said brake band when the brake drum rotates in a reverse direction.

13. In a fishing reel, the combination of a body member having an end plate with a radially disposed slot therein, said slot terminating at its inner end in a relatively wider opening, a brake supporting member having a slot engaging portion and an overhanging portion, which is adapted to pass through the relatively wider opening at the inner end of said slot, and a screw threaded member extending axially into said slot and into said brake supporting member, whereby said brake supporting member may be adjusted radially while held in said slot by said overhanging portion.

14. In a fishing reel of the character described, the combination of a body member having a radial slot therein, a brake drum, a brake shoe supporting member slidably mounted in said slot, a freely rotatable lead screw extending into said slot and terminating in threaded engagement with said brake shoe supporting member, whereby a turning of said lead screw will move said brake shoe supporting member radially with respect to said brake drum, a collar intermediate the ends of said lead screw, a spring surrounding said lead screw intermediate said collar and said frame, and a knurled end upon said lead screw, whereby it may be turned to adjust the position of said brake shoe supporting member with respect to both said spring and said brake drum.

15. In a fishing reel of the character described, the combination of a body member having a radial slot therein, a rotatable notched click wheel, a click supporting member slidably mounted in said slot, a freely rotatable lead screw extending into said slot and terminating in threaded engagement with said click supporting member, whereby a turning of said lead screw will move said click supporting member radially with respect to said click wheel, a collar intermediate the ends of said lead screw, a spring surrounding said lead screw intermediate said collar and said frame, and a knurled end upon said lead screw, whereby it may be turned to adjust the position of said click with respect to said spring and said click wheel.

EDWARD NORTON MOOR.